(12) United States Patent
Bonilla

(10) Patent No.: US 7,196,154 B2
(45) Date of Patent: Mar. 27, 2007

(54) METHOD OF PRODUCING POLYMER RESINS

(75) Inventor: Rafael Bonilla, Torrance, CA (US)

(73) Assignee: Light Black Inc., Tokyo (JP)

( * ) Notice: Subject to any disclaimer, the term of this patent is extended or adjusted under 35 U.S.C. 154(b) by 428 days.

(21) Appl. No.: 10/000,765

(22) Filed: Oct. 31, 2001

(65) Prior Publication Data

US 2002/0166630 A1    Nov. 14, 2002

Related U.S. Application Data

(60) Provisional application No. 60/254,732, filed on Dec. 11, 2000.

(51) Int. Cl.
    *C08G 18/32*    (2006.01)
(52) U.S. Cl. .............................. 528/64; 528/68; 528/84
(58) Field of Classification Search .................. 528/64, 528/68, 84
    See application file for complete search history.

(56) References Cited

U.S. PATENT DOCUMENTS

| 5,126,170 A | 6/1992 | Zwiener et al. |
| 5,236,741 A | 8/1993 | Zwiener et al. |
| 5,243,012 A | 9/1993 | Wicks et al. |
| 5,312,886 A | 5/1994 | House et al. |
| 5,633,336 A | 5/1997 | Gras et al. |
| 6,013,755 A | 1/2000 | Primeaux, II et al. |

OTHER PUBLICATIONS

Siniay Luthra et al., "Applications of Polyaspartic Esters In Polyurea Coatings" Symposium presented at the 21$^{st}$ Higher Solids and Waterborne Coating Symposium, New Orleans, LA, Feb. 1994, pp. 417-438.
Shiwei Guan, Ph. D., "One Hundred Percent Solids Aliphatic Polyurethane Coatings—From Dream to Reality," Madison Chemical Industries Inc., Ontario, Canada, 1999, pp. 1-13, 1-2.

*Primary Examiner*—Rachel Gorr
(74) *Attorney, Agent, or Firm*—Christie, Parker & Hale, LLP

(57) ABSTRACT

One embodiment of the invention is a composition adapted for coating goods comprising a polyisocyanate component and a polyisocyanate reactive component further comprising a polyaspartic ester and cycloaliphatic amine. Another embodiment of the invention is a method for coating goods by mixing a preferred polyisocyanate component with a preferred polyisocyanate reactive component and then applying the coating to the goods which are to be coated. Yet another embodiment of the invention is a method of adhering two surfaces by forming a coating by mixing a preferred polyisocyanate component with a preferred polyisocyanate reactive component, applying the coating mixture to one surface and contacting the second surface to the coated first surface.

23 Claims, 16 Drawing Sheets

FIGURE 16

Comparison of Hardness (Shore D)

| Clearlink1000/NH1220 | HD100/XP7100 | | | | | | | | | |
|---|---|---|---|---|---|---|---|---|---|---|
| | 100/0 | | 75/25 | | 50/50 | | 20/80 | | 0/100 | |
| | 1 day | 3 day | 1 day | 3 day | 1 day | 3 day | 1 day | 3 day | 1 day | 3 day |
| 100/0 | 81 | 83 | 81 | 83 | 83 | 84 | 84 | 84 | 82 | 84 |
| 80/20 | 82 | 82 | 82 | 84 | 81 | 82 | 84 | 84 | 84 | 85 |
| 65/35 | 81 | 84 | 81 | 83 | 83 | 84 | 82 | 83 | 84 | 84 |
| 55/45 | 81 | 80 | 80 | 80 | 81 | 81 | 81 | 82 | 82 | 81 |
| 25/75 | 78 | 80 | 78 | 80 | 79 | 79 | 79 | 80 | 80 | 82 |
| 0/100 | 75 | 75 | 75 | 75 | 79 | 79 | 79 | 80 | 80 | 81 |

Table 1

FIGURE 17

Comparison of Hardness (Shore D)

| Clearlink1000/NH1220 | HD100/HDB-LV | | | | | | | | | |
|---|---|---|---|---|---|---|---|---|---|---|
| | 100/0 | | 75/25 | | 50/50 | | 25/75 | | 0/100 | |
| | 1 day | 3 day | 1 day | 3 day | 1 day | 3 day | 1 day | 3 day | 1 day | 3 day |
| 100/0 | | 83 | | | | 85 | | 84 | Not determined | 84 |
| 80/20 | | 82 | | 83 | | 83 | | | | 84 |
| 65/35 | | 84 | 80 | 82 | | 82 | | 83 | 84 | 82 |
| 55/45 | 81 | 80 | | 80 | 82 | 81 | 81 | 80 | | 81 |
| 25/75 | | 80 | | 81 | | 82 | | 81 | | 82 |
| 0/100 | | 75 | | 80 | | 80 | | 80 | | 82 |

Table 2

FIGURE 18

Comparison of Hardness (Shore D)

| Clearlink1000/ NH1220 | 100/0 | | 75/25 | | 50/50 | | 25/75 | | 0/100 | |
|---|---|---|---|---|---|---|---|---|---|---|
| | 1 day | 3 day | 1 day | 3 day | 1 day | 3 day | 1 day | 3 day | 1 day | 3 day |
| 100/0 | | 83 | | 82 | | 83 | | 84 | | 85 |
| 80/20 | | 82 | | 82 | | 84 | | 83 | | 85 |
| 65/35 | 81 | 84 | 81 | 82 | 81 | 84 | 81 | 84 | 83 | 80 |
| 55/45 | | 80 | | 81 | | 82 | | 80 | | 82 |
| 25/75 | | 80 | | 81 | | 81 | | 83 | | 82 |
| 0/100 | | 75 | | 80 | | 80 | | 81 | | 82 |

Table 3

METHOD OF PRODUCING POLYMER RESINS

RELATED APPLICATION

Pursuant to 35 U.S.C. § 119(e), this application claims the benefit of the U.S. Provisional Application 60/254,732, filed Dec. 11, 2000.

BACKGROUND OF THE INVENTION

1. Field of the Invention

This invention relates polymer chemistry used to formulate coatings

2. Introduction

Polymer resins serve an important niche in structural engineering by offering the engineer the ability to tune the tensile strength, hardness, corrosion resistance, deformability and optical properties on a continuum scale by merely adjusting the components of the polymerization process. Although polymer resins offer a wide continuum of physical properties, it is virtually impossible a priori to predict a set of physical properties based on a set of initial reactants. One of the more common methods of formulating polymer resins employs mixing a polyisocyanate with either a poly-ol and/or poly-aspartic ester. See e.g. U.S. Pat. Nos. 5,126,170 and 5,236,741. There are a number of advantages with formulating polymer resins in this manner. These formulations are simple, cost effective, and by varying either the ratio of the polyisocyanate and the aspartic ester/poly-ol or by varying the kinds of polyisocyanate and aspartic ester/poly-ol employed, a wide range of the polymers with different physical properties can be produced. There are however, some significant disadvantages with these formulations. Polymer formulations based on polyisocyanate and poly-aspartic ester mixtures tend to deteriorate over time leading to coating softening and ultimately delamination. Coating failure is further accelerated when a coating is exposed to moisture or applied in layers greater than 20 millimeters. Although the exact mechanism of the failure of polyisocyanate/poly-aspartic ester based polymers is unknown, it is believed a rearrangement reaction occurs releasing ethanol which then accumulates in the coating causing coating failure.

In addition to forming coating polymers from polymeric addition reactions between polyisocyanates and poly-aspartic esters, coating polymers may also be formed from addition reactions between polyisocyanates and cycloaliphatic amines. See e.g. U.S. Pat. No. 5,312,886. This latter class of polymers, although offering improved physical characteristics compared to the poly-aspartic based polymers, is very expensive to manufacture due to the high price of cycloaliphatic amines. Sterically hindered cycloaliphatic amines cost approximately three times the cost of poly-aspartic amines.

Accordingly, a coating composition is needed that resists softening with time, is stable in a moist environment, but is still simple and inexpensive to fabricate and allows the physical properties of the polymer resins to be adjusted by adjusting the type and ratios of the polyisocyanates and the polyisocyanate reactive components.

The present invention is based upon the unexpected discovery that if a polyisocyanate is reacted with a polyaspartic ester and a cycloaliphatic amine the resulting polymer resin has superior physical characteristics, including superior hardness, superior resistance to hydrolytic degradation, superior resistance to acid/base catalyzed hydrolytic degradation and superior resistance to melting than resins formed from the mixing of polyisocyanate with either a polyaspartic ester or a cycloaliphatic amine.

SUMMARY OF THE INVENTION

One embodiment of the invention is a composition adapted for coating goods comprising a polyisocyanate component and a polyisocyanate reactive component further comprising a polyaspartic ester and cycloaliphatic amine.

A preferred polyisocyanate reactive component comprises a mixture of a poly-aspartic ester shown in FIG. 1 and a cycloaliphatic amine shown in FIG. 2.

In a preferred poly-aspartic ester R1, R2, R3, and R4 may be identical or different and are preferably organic functional groups inert towards isocyanate groups, n is preferably an integer of at least 2. X is preferably a linear or branched alkyl chain or a cycloaliphatic chain that is inert towards isocyanate groups.

In a preferred cycloaliphatic amine Y1 and Y2 are preferably each either a branched or linear alkyl chain having one to ten carbons, or hydrogens. Preferably Y3, Y4, Y5 and Y6 each are independently selected from the group consisting of hydrogen and alkyl groups containing from 1 up to about 5 carbons atoms. The alkyl groups may be linear or branched. In the compound shown in FIG. 2, the amine groups (Y1NH—R, Y2NH—R) and the Y3, Y4 groups may occupy any position on the respective rings. Additionally, there is no restriction as to the relative positions of the amine groups (Y1NH—R, Y2NH—R) relative to the Y3, Y4 alkyl groups.

Another embodiment of the invention is a method for coating goods by mixing a preferred polyisocyanate component with a preferred polyisocyanate reactive component and then applying the coating to the goods that are to be coated. Yet another embodiment of the invention is a method of adhering two surfaces by forming a coating by mixing a preferred polyisocyanate component with a preferred polyisocyanate reactive component, applying the coating mixture to one surface and contacting the second surface to the coated first surface.

BRIEF DESCRIPTION OF THE FIGURES AND TABLES

FIG. 16 shows Table 1 which provides data on the relative hardness of the resins, according to the Shore D test, one day and three days after mixing a plurality of preferred polyisocyanate components with a plurality of preferred polyisocyanate reactive components.

FIG. 17 shows Table 2 which provides data on the relative hardness of the resins, according to the Shore D test, one day and three days after mixing a plurality of preferred polyisocyanate components with a plurality of preferred polyisocyanate reactive components.

FIG. 18 shows Table 3 which provides data on the relative hardness of the resins, according to the Shore D test, one day and three days after mixing a plurality of preferred polyisocyanate components with a plurality of preferred polyisocyanate reactive components.

Figure 1:
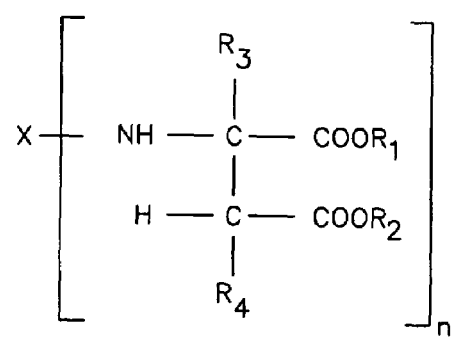
FIG. 1 shows a preferred polyaspartic ester used to formulate a preferred polymer.

Table 4 shows the glass transition temperatures of four resin which may be produced from the compositions and methods according to the invention.

DETAILED DESCRIPTION OF THE INVENTION

A preferred embodiment of the invention is a coating composition comprising a polyisocyanate component and a polyisocyanate reactive component. For the purposes of this invention, a coating includes any film or resin. In one embodiment of the present invention the coating thickness can be from about 0.01 millimeters to about 10 centimeters. Preferably, the coating thickness is about 0.5 millimeters to about 6 millimeters, and more preferably the coating thickness is approximately 0.5 millimeters to 1 millimeter. Those skilled in the art will appreciate that other thickness can be used.

The polyisocyanate component of the present invention may comprise any commonly available polyisocyanate or alkyl-isocyanate. It is understood that the alkyl group can be linear, branched, or cyclic, and may be either saturated or unsaturated. A preferred polyisocyanate component may be selected from the group of polyisocyanates consisting of: aromatic diisocyanates such as 2,4-toluene diisocyanate, 2,6-toluene diisocyanate, 4,4'-diphenylmethane diisocyanate, 2,4'-diphenylmehtane diisocyanate, 2,2'-diphenylmethane diisocyanate, 1,2-phenylene diisocyanate, 1,3-phenylene diisocyanate, 1,4-phenylene diisocyanate, 1,4-naphthalene diisocyanate, 1,5-naphthalene diisocyanate, chlorophenylene-2,4-diisocyanate, 4,4'-diphenyl ether diisocyanate, 3,3'-dimethyldiphenylmethane-4,4'-diisocyanate, 3,3'-dimethoxydiphenyl-4,4'-diisocyanate; aliphatic diisocyanates such as 1,6-hexamethylene diisocyanate, 1,4-tetramethylene diisocyanate, 2,2,4-trimethyl-1,6-hexamethylene diisocyanate, 2,4,4-trimethyl-1,6-hexamethylene diisocyanate, decamethylene diisocyanate, lysine diisocyanate; arylaliphatic diisocyanates such as o-xylene diisocyanate, m-xylene diisocyanate, p-xylene diisocyanate ; and allkyl-cyclic diisocyanates such as 1,4-cyclohexyl diisocyanate, isophorone diisocyanate, hydrogenated toluene diisocyanate, hydrogenated xylene diisocyanate.

In the methods and compositions according to the invention is also preferred to use polyisocyanates containing at least one kind of bond selected from group consisting of uretdione bonds, isocyanurate bonds, allophanate bonds, biuret bonds, uretonimine bonds, carbodiimide bonds, urethane bond, and urea bonds obtained by modifying the above-mentioned organic polyisocyanates. Other suitable isocyanates may comprise preferably 5/95 to 90/10, more preferably 7/93 to 70/30, and particularly preferably 10/90 to 50/50 uretdione/isocyanurate bonds.

In an alternative embodiment of the invention isocyanate containing prepolymers based on monomeric or short chain polyisocyanates may also be employed as a preferred polyisocyanate component. A preferred polyisocyanate prepolymer may be prepared by reacting from 1–4 equivalents of a poly-ol or polyamine with one of the isocyanates or polyisocyanates detailed above. For the purposes of this application, an equivalent of a polyamine or poly-ol may be defined as an amount which furnishes as many isocyanate reactive hydrogen atoms from the amino groups or from the reactive hydroxyl groups as there are isocyanate groups in the polyisocyanate reactant.

Examples of suitable poly-ols that may be employed to form polyisocyanate propolymers include: propylene glycol, 1,3 propylene glycol, 1,4- and 2,3 butylene glycol, 1,6-hexadiol, 1,8-octanediol, neopentyl glycol, cyclohexane dimethanol, 2-methyl-1,3-propanediol, glycerol, trimethylolpropane, 1,2,6-hexanetriol, 1,2,4 butantriol, pentaerythritol, mannitol, sorbitol, diethylene glycol, triethylene glycol, tetraethylene glycol, poly(ethyleneoxy) glycols generally, dipropylene glycol, dibutylene glycol and polycaprolactone. Other polyhydroxyl materials of higher weight which may be used as backbone poly-ols for polyisocyanate prepolymers are polymerization products of epoxides, such as ethylene oxide, propylene oxide, butylene oxide, styrene oxide and epichlorohydrin, with materials having reactive hydrogen compounds, such as water and more particularly, alcohols, including ethylene glycol, 1,3-and 1,2-propylene glycol, trimethylolpropane. Hydroxyl containing polyesters, polythioethers, polyacetal, polycarbonates, and polyester amides also may be used as backbone poly-ols instead of or together with the foregoing poly-ols. Suitable polyesters include the reaction product of polyhydric alcohols and polybasic, preferably dibasic, carboxylic acids. The polyhydric alcohols which are often used include the dihydric alcohols mentioned above. Examples of preferred carboxylic acids include succinic acid, adipic acid, suberic acid, azeliaic acid, sebacic acid, glutaric acid, phthalic acid, maleic acid and fumaric acid. Hydroxyl containing polythioethers, polyacetals, polycarbonates, and polyesteramides are less frequently employed in the preparation of polyisocyanate prepolymers. But still, they are sufficiently well known in the art that they need not be further expounded upon here.

A significant difference in the preparation of polyisocyanate prepolymers with dihydric poly-ols and higher poly-ols is that the higher poly-ols may be employed to prepared a 3 dimensional network of prepolymer chains, whereas if dihydric poly-ols are employed to prepare prepolymers only linear prepolymers will be formed.

Preferred polyamines for the preparation of polyisocyanate prepolymers include diamines and triamines.

Another class of polyamines useful for the preparation of polyisocyanate prepolymers has the formula $H_2N$—Z—$H_2N$. Z may be a linear or branched alkylene chain or a poly(alkyleneoxy) or a polyester group with a total molecular weight of 200–6000 atomic units. Alternatively, higher order polyamines may also be utilized. It should be understood that the aforementioned polyamines are only intended as exemplary polyamines for the formation of the polyisocyanate pre-polymers. Other suitable mono or polyamines for the formation of polyisocyanate prepolymers are well known in the art.

Figure 2:
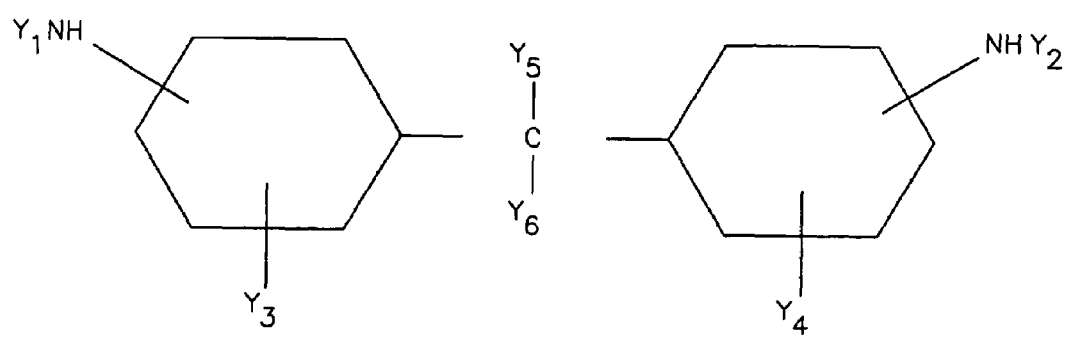
FIG. 2 shows a preferred cycloaliphatic amine used to formulate a preferred polymer

A preferred polyisocyanate reactive component comprises a mixture of a poly-aspartic ester shown in FIG. 1 and a cycloaliphatic amine shown in FIG. 2.

In a preferred poly-aspartic ester R1, R2, R3, and R4 may be identical or different and are preferably organic functional groups inert towards isocyanate groups. R1 and R2 may be selected from the organic functional groups inert to isocyanate groups consisting of: methyl groups, ethyl groups, propyl groups, and butyl groups. In a preferred poly-aspartic ester R1, R2, R3, R4 may be identical or different and are preferably organic functional groups inert towards isocyanate groups or hydrogen atoms. R1 and R2 are preferably each a methyl group or an ethyl group. R3 and R4 are preferably each hydrogen.

n is preferably an integer of at least 2.

X is preferably a linear or branched alkyl chain or a cycloaliphatic chain that is inert towards isocyanate groups. X may be selected from the group of compounds formed by removing amino groups from: 1,4-diaminobutane, 1,6-diaminohexane, 2,2,4-trimethyl-1,6-diaminohexane, 2,4,4-trimethyl-1,6-diaminohexane, 1-amino-3,3,5-trimethyl-5-aminomethylcyclohexane, 4,4'-diamino-dicyclohexylmethane, 3,3 '-dimethyl-4,4'-diamino-dicyclohexylmethane, 2-methyl-1,5-diaminopentane, 1,11-diaminoundecane, 1,12-diaminododecane, 1,4-diaminocyclohexane or 1,2-diaminocyclohexane. These poly-aspartic esters are commercially available and/or may be prepared according to the methods of U. S. Pat. No. 5,126,170.

A preferred cycloaliphatic amine is shown in FIG. 2. Y1 and Y2 are preferably each either a branched or linear alkyl chain having one to ten carbons, or a hydrogen. Representative alkyl groups include, methyl, ethyl, propyl, isopropyl, buytl, isobutyl, secondary butyl, tertiary butyl and the various isomeric pentyl, hexyl, heptyl, octyl, nonyl and decyl groups. Preferably Y1 and Y2 are alkyl groups having one to six carbons such as n-butyl, isobutyl, sec-butyl, and t-butyl. Y3, Y4, Y5 and Y6 each are independently selected from the group consisting of hydrogen and alkyl groups containing from 1 up to about 5 carbons atoms. The alkyl groups may be linear or branched. The case where Y3 and Y4 are each a hydrogen, methyl group or ethyl group is particularly preferred. The case where Y1 and Y2 are each a hydrogen or methyl group is also particularly preferred. In the compound shown in FIG. 2, the amine groups (Y1NH—R, Y2NH—R) and the Y3, Y4 groups may occupy any position on the respective rings. Additionally, there is no restriction as to the relative positions of the amine groups (Y1NH—R, Y2NH—R) relative to the Y3, Y4 alkyl groups.

Although, the bis(N-alkylaminocyclohexyl) methanes may be placed anywhere on the ring relative to the Y5Y6 group, the 4,4' positions relative to the alkyl bridge are the most preferred.

Polymers of this invention may be formed by mixing the preferred poly/isocyanates components of the invention with the preferred polyisocyante reactive components of the invention such that approximately 1 equivalent of isocyanate is reacted with approximately 1 equivalent of an isocyanate reactive group. Those skilled in the art will appreciate that varying stoichiometries may be used to modify the speed of the reaction, the extent of the reaction or the viscosity of the resulting resin. Stoichiometries of the present invention include, but are not limited to, ranges from 1:2 to 2:1. In one embodiment of the present invention a stoichiometry of approximately 1:2 is preferred. In another embodiment a stoichiometry of approximately 2:1 is preferred. The reactants to form the polymers according to the invention are preferably mixed at about 60° F. to about 250° F., with 100° F. to 160° F. most preferred.

As one skilled in the art will certainly appreciate, cure time will depend upon the type of polyisocyanates, poly-aspartic esters and cycloaliphatic amines employed to make the polymers. When catalysts are needed to promote curing, organic tin compounds may be preferably employed. Such tin catalysts may include: tin(II) salts of carboxylic acids such as tin(II)acetate, tin(II)octoate, tin(II)ethylhexoate and tin(II) laurate as well as such materials as the dialkyl tin salts of the carboxylic acids. Such tin salts may be used either alone or as a complex with amidines such as amino pyridines, amino pyrimidines, hydrazine pyridines and tetrahydropyrimidines.

Catalysts based on metals such as lead, iron, mercury, bismuth, cobalt, and manganese may also be employed, including in particular, cobalt(III)acetylacetonate, cobalt naphthoate, manganese naphthoate, lead oleate, bismuth neodecanoate and zinc napthenate. Other catalysts which may also be employed include tertiary amines such as triethylamine, tributylamine, N-methylmorpholine, 1,4-diaza-bicylco-(2,2,2)-octane, N-methyl-N'dimethylaminoethylpiperazine, N,N-dimethylbenzylamine, N'N-dimethylcyclohexylamine and 1,2-dimethylamidazole.

These catalysts are generally used in an amount from about to 0.01 to about 1.0% by weight, based on the quantity of poly/isocyanates and poly/isocyanate reactive component.

Polymer resins according to the invention with particularly useful physical characteristics may be formed from mixing a polyisocyanate component comprising a uretidione, an isocyanurate, and an allophanate with a polyisocyanate reactive component comprising the poly-aspartic ester shown in FIG. 1 and the cycloaliphatic amine shown in FIG. 2. Suitable commercial reactants are commercially readily available, including: XP-7100 (a mixture of 24% (6-isocyanatohexyl)[[(6-isocyanatohexyl)amino]carbonyl]-butyl ester and 76% 1,3,5 triazine-2,4,6-trione, 1,3,5, tris(6-isocyanatohexyl), manufactured by Bayer AG), HD100 (a mixture of 75% 2,4-Uretidinedione, 1,3, (6-iscyantohexyl) and 25% 1,3,5 triazine-2,4,6-trione, 1,3,5, tris(6-isocyanatohexyl)manufactured by Lyondell), HDB-LV (biuret, 1,3, 5,-tris(6-hydroxyhexyl)-, triisocyanate ester manufactured by Rhodia), Desmophen NH1220 (Aspartic acid, N,N'-(2-methyl-1,5-pentadienyl)bis-, tetraethyl ester manufactured by Bayer), Clearlink 1000 (cyclohexanamine, 4,4'-methylenebis[N-(1-methylpropy)] manufactured by UOP). The polyisocyanate component composition may employ any fractional weight composition of allophanate, isocyanurate and uretidione. Preferred polyisocyanate reactive component compositions may range 5–95%/95–5% by weight cycloaliphatic amine/aspartic ester. The polyisocyanate component is preferably mixed with polyisocyanate reactive components such that approximately 1 equivalent of isocyanate is reacted with 1 equivalent of isocyanate reactive groups. Although a 1:1 isocyanate reaction stoichiometry is preferred, one skilled in art will recognize this ratio may be adjusted up or down to modify the speed of the reaction, the extent of the reaction or the viscosity of the resulting resin. Stoichiometries of the present invention include, but are not limited to, ranges from 1:2 to 2:1. In one embodiment of the present invention a stoichiometry of approximately 1:2 is preferred. In another embodiment a stoichiometry of approximately 2:1 is preferred.

Table 1 shows the relative hardness of resins according to the invention, as determined by the Shore D test 1 day and 3 days after mixing a polyisocyanate composition comprising XP-7100 and HD 100 and a polyisocyanate reactive component mixture comprising Clearlink 1000 and Desmophen NH 1220 as a function the relative amounts by weight of the XP-7100, HD-100, Clearlink 1000, and the NH 1220. Accordingly, Table 1 suggests that as the percentage of cycloaliphatic amine is increased relative to the percentage of aspartic ester, the hardness of the resulting resin is increased. Table 1 also suggests that over all composition ranges of the polyisocyanate and polyisocyanate reactive components, the resin reaches near maximal hardness within one day of mixing.

Other polymer resins according to the invention with particularly useful physical characteristics may be formed from mixing a polyisocyanate component comprising a uretidione, an isocyanurate, and an HDI-biuret with a polyisocyanate reactive component comprising the poly-aspartic ester shown in FIG. 1 and the cycloaliphatic amine shown in FIG. 2. Suitable commercial reactants are commercially readily available, including: HDB-LV Biuret (manufactured by Rhodia), HD100(manufactured by Lyondell A G), Desmophen NH 1220 (manufactured by Bayer A G), and Clearlink 1000(manufactured by UOP, Inc.). The polyisocyanate component composition may employ any fractional weight composition of HDI-biuret, isocyanurate and uretidione. Preferred polyisocyanate reactive component compositions may range 5–95%/95–5% by weight cycloaliphatic amine/aspartic ester.

Table 2 shows the relative hardness of resins according to the invention, as determined by the Shore D test 1 day and 3 days after mixing a polyisocyanate composition comprising HDB-LV and HD 100 and a polyisocyanate reactive component mixture comprising Clearlink 1000 and Desmophen NH 1220 as a function the relative amounts by weight of the XP-7100, HD-100, Clearlink 1000, and the NH 1220. Table 2 further generalizes the trends seen in Table 1, namely, that as the percentage of cycloaliphatic amine is increased relative to the percentage of polyaspartic ester, the hardness of the resulting resin is increased. These results are still further generalized in Table 3, where the relative hardness of the of resins according to the invention, as determined by the Shore D test 1 day and 3 days after mixing a polyisocyanate composition comprising N3300 and HD 100 and a polyisocyanate reactive component mixture comprising Clearlink 1000 and Desmophen NH 1220 as a function the relative amounts by weight of the XP-7100, DH-100, Clearlink 1000, and the NH 1220 is shown. Once again, the general relative hardness trends of resins according to the invention as a function of composition suggested in Tables 1–2, is suggested again.

Figure 3:
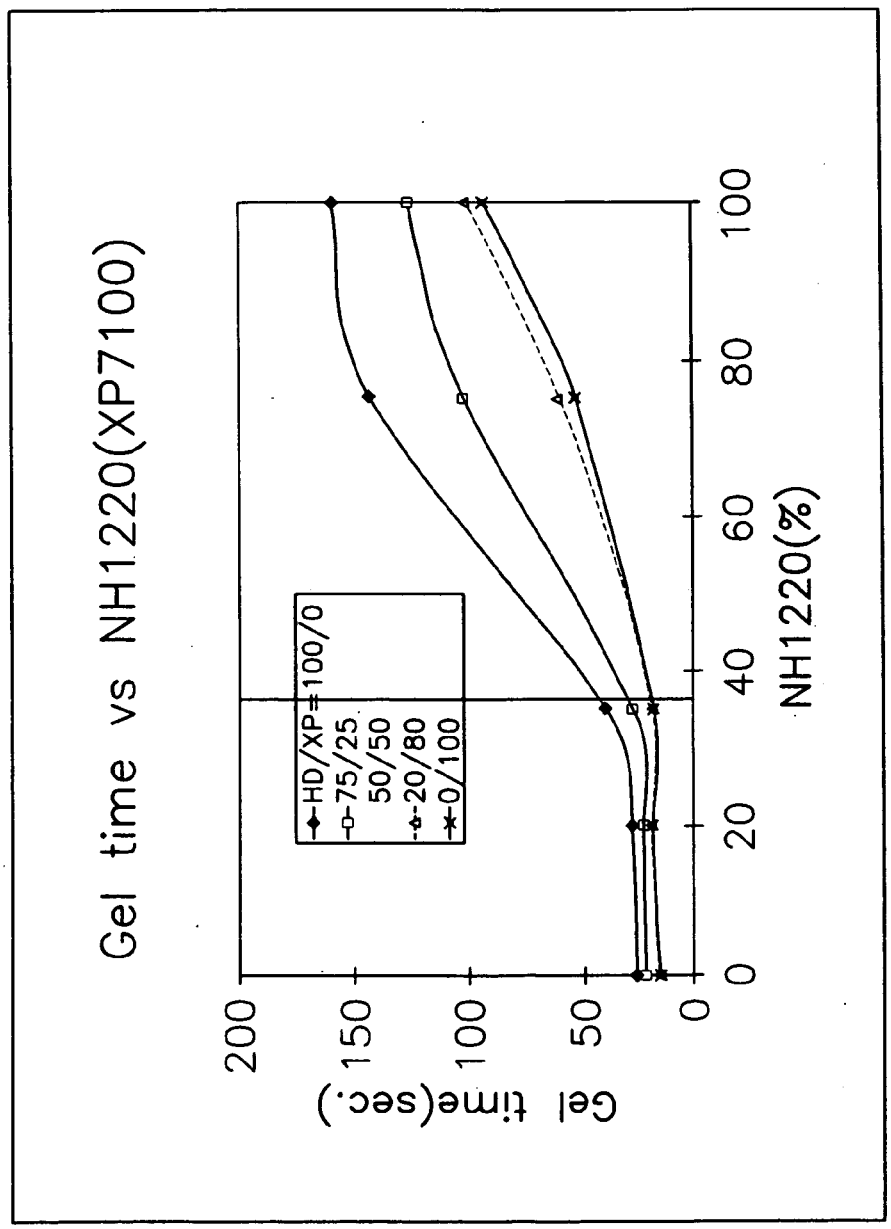
FIG. 3 shows the relative gelling time for resins resulting from mixing a preferred polyisocyanate component according to the invention with a preferred polyisocyante reactive component according to the invention as function of the composition of the polyisocyanate reactive component.
Figure 4:
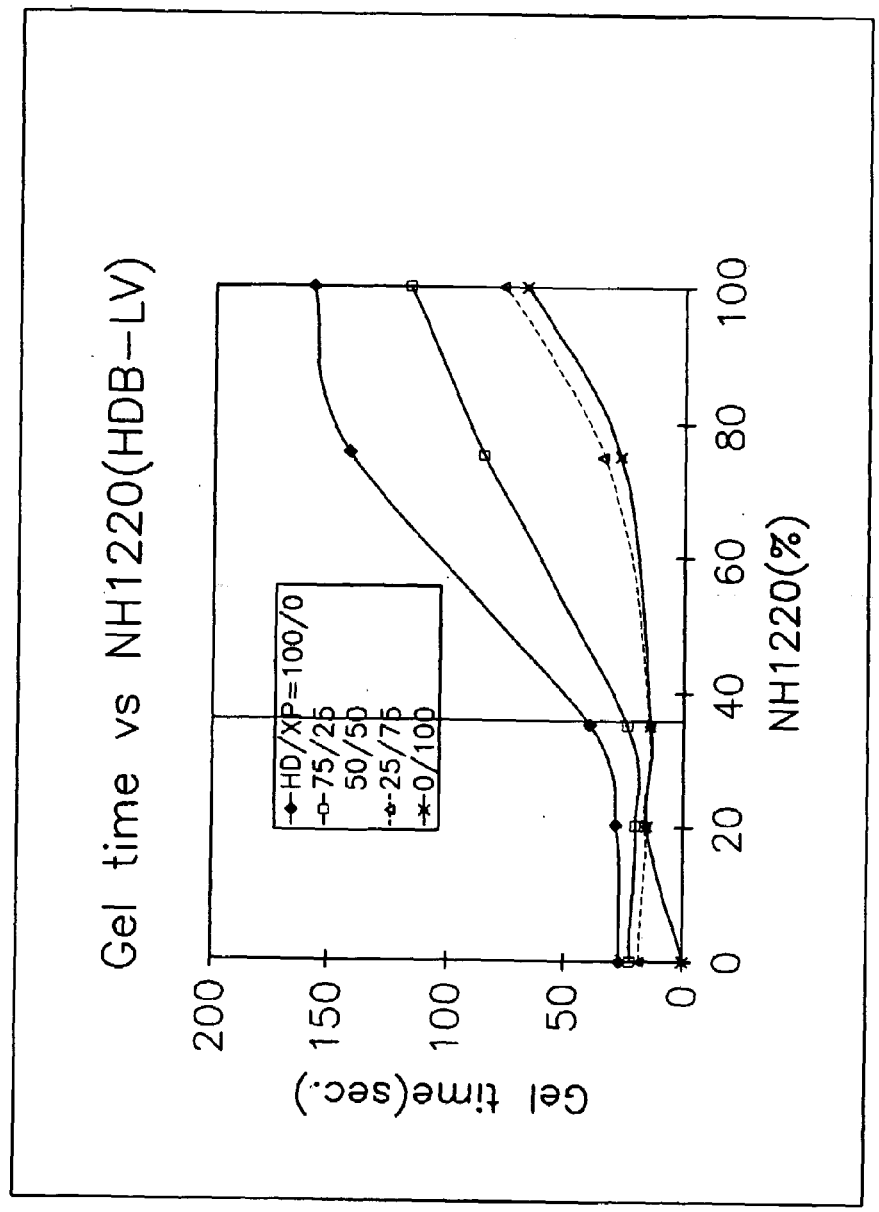
FIG. 4 shows the relative gelling time for resins resulting from mixing a preferred polyisocyanate component according to the invention with a preferred polyisocyante reactive component according to the invention as function of the composition of the polyisocyanate reactive component.
Figure 5:
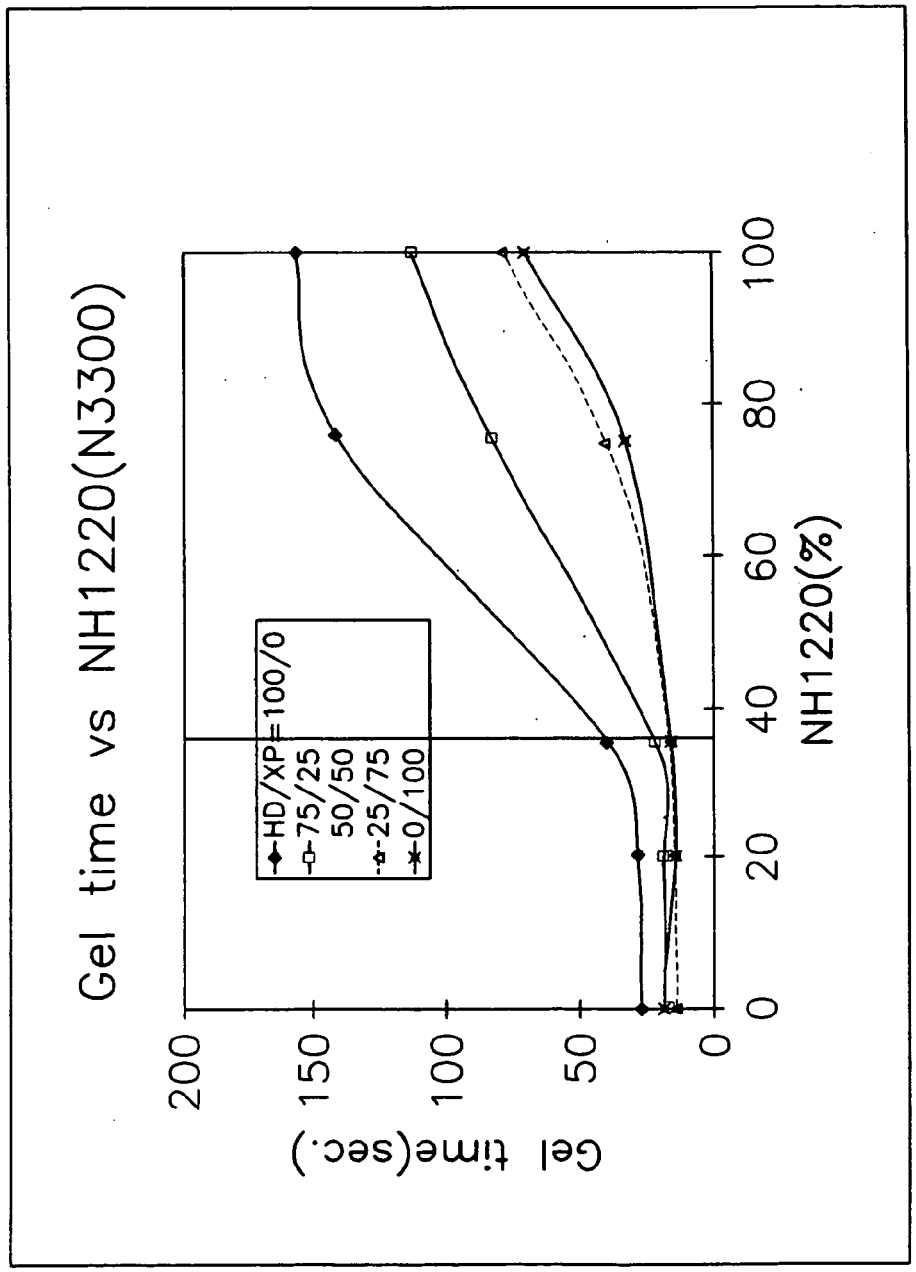
FIG. 5 shows the relative gelling time for resins resulting from mixing a preferred polyisocyanate component according to the invention with a preferred polyisocyanate reactive component according to the invention as function of the composition of the polyisocyanate reactive component.
Figure 6:
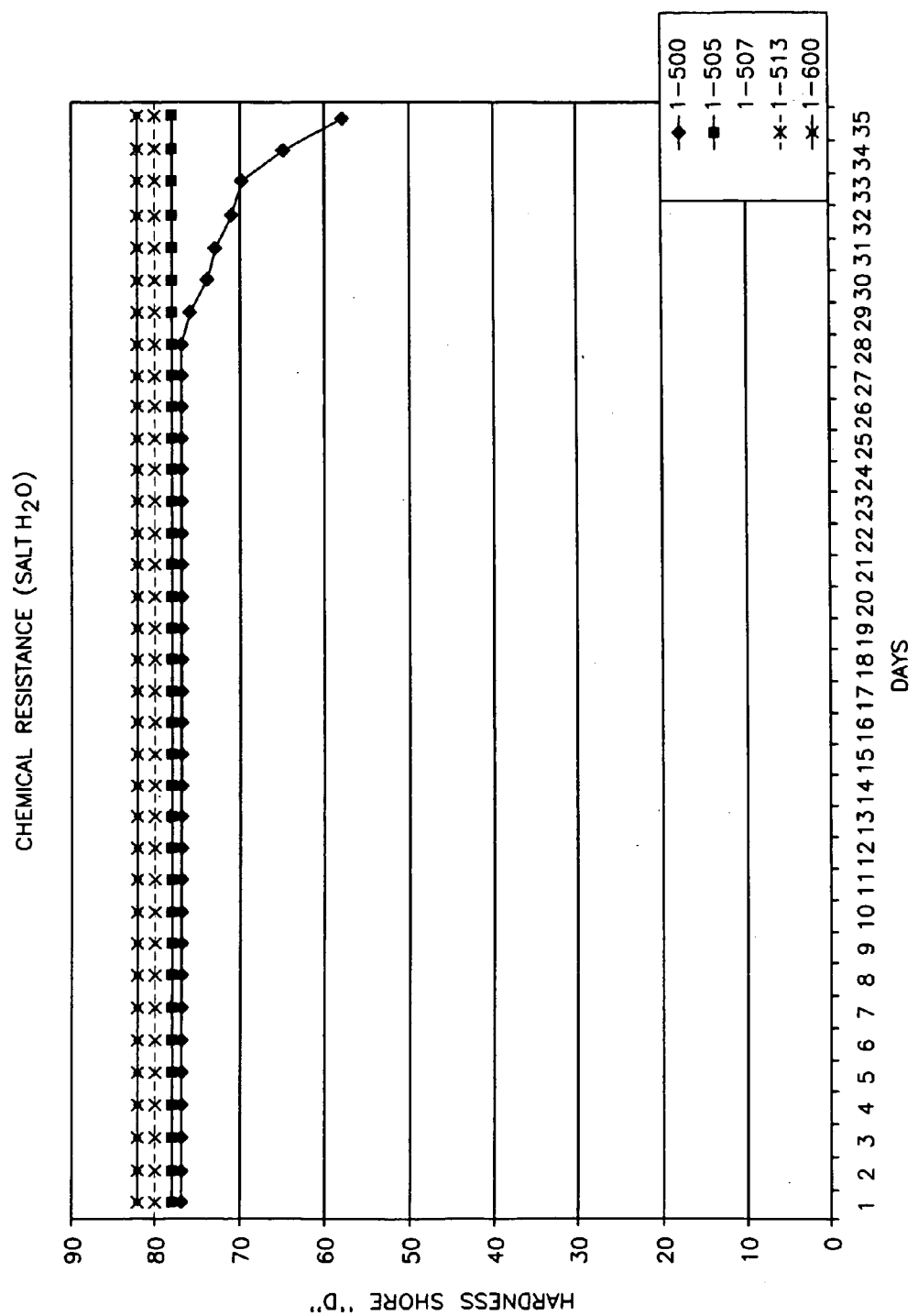
FIG. 6 shows the relative hardness of five resins produced from the compositions and methods according to the invention as a function of exposure time in salt water and as a function of the composition.
Figure 7:
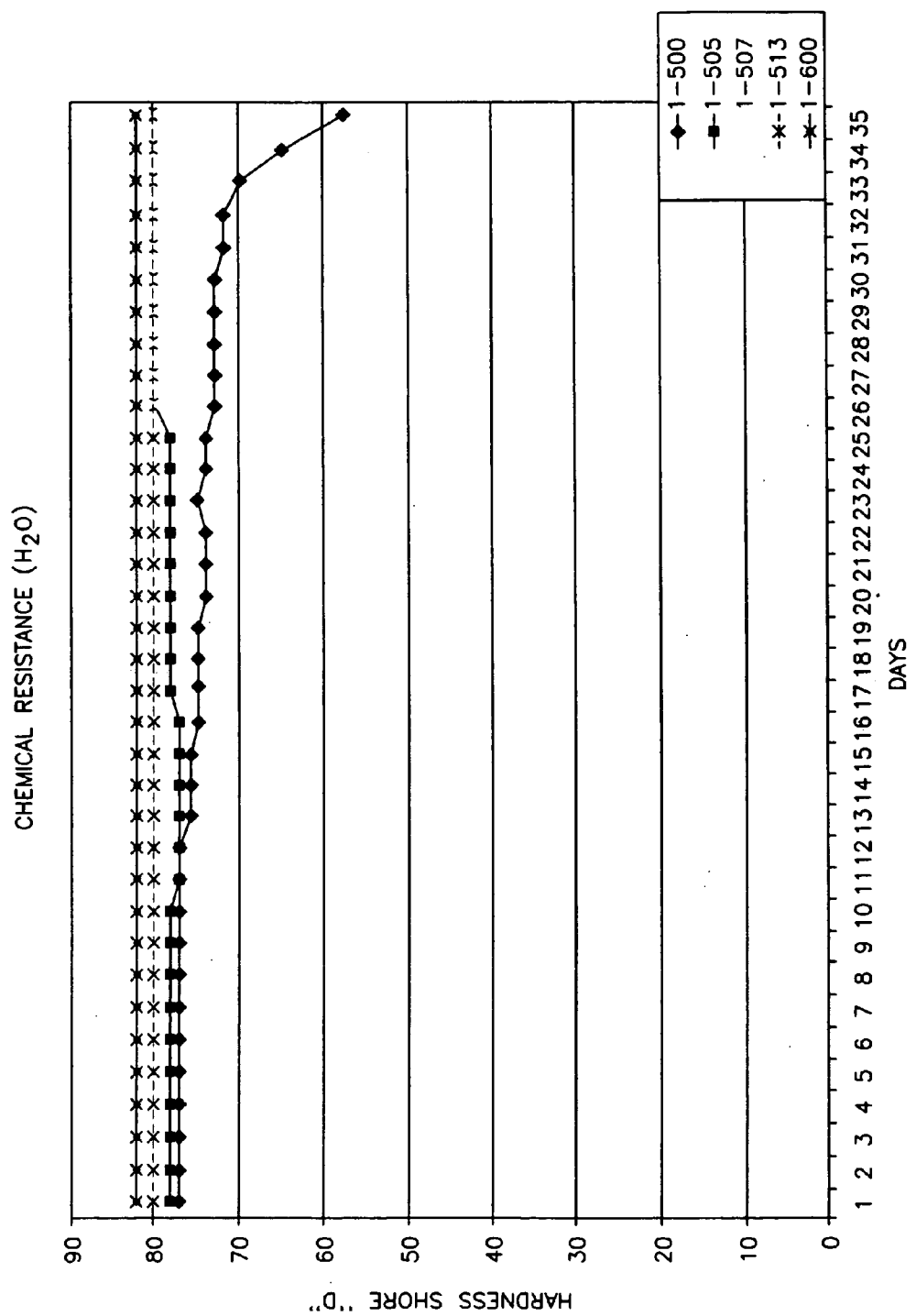
FIG. 7 shows the relative hardness of five resins produced from the compositions and methods according to the invention as a function of exposure time in distilled water and as a function of the composition.
Figure 8:
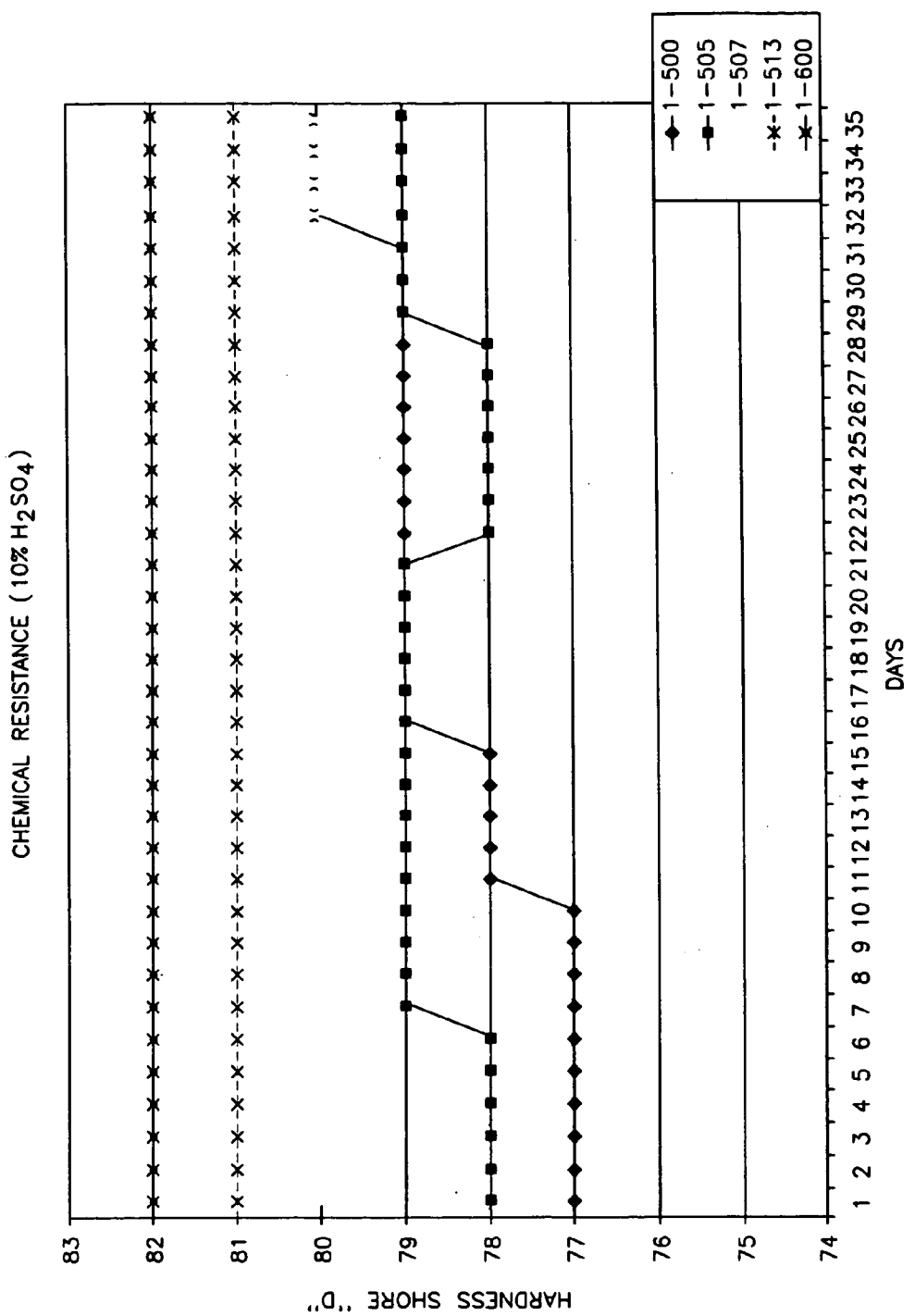
FIG. 8 shows the relative hardness of five resins produced from the compositions and methods according to the invention as a function of exposure time in 10% aqueous sulfuric acid and as a function of the composition.
Figure 9:
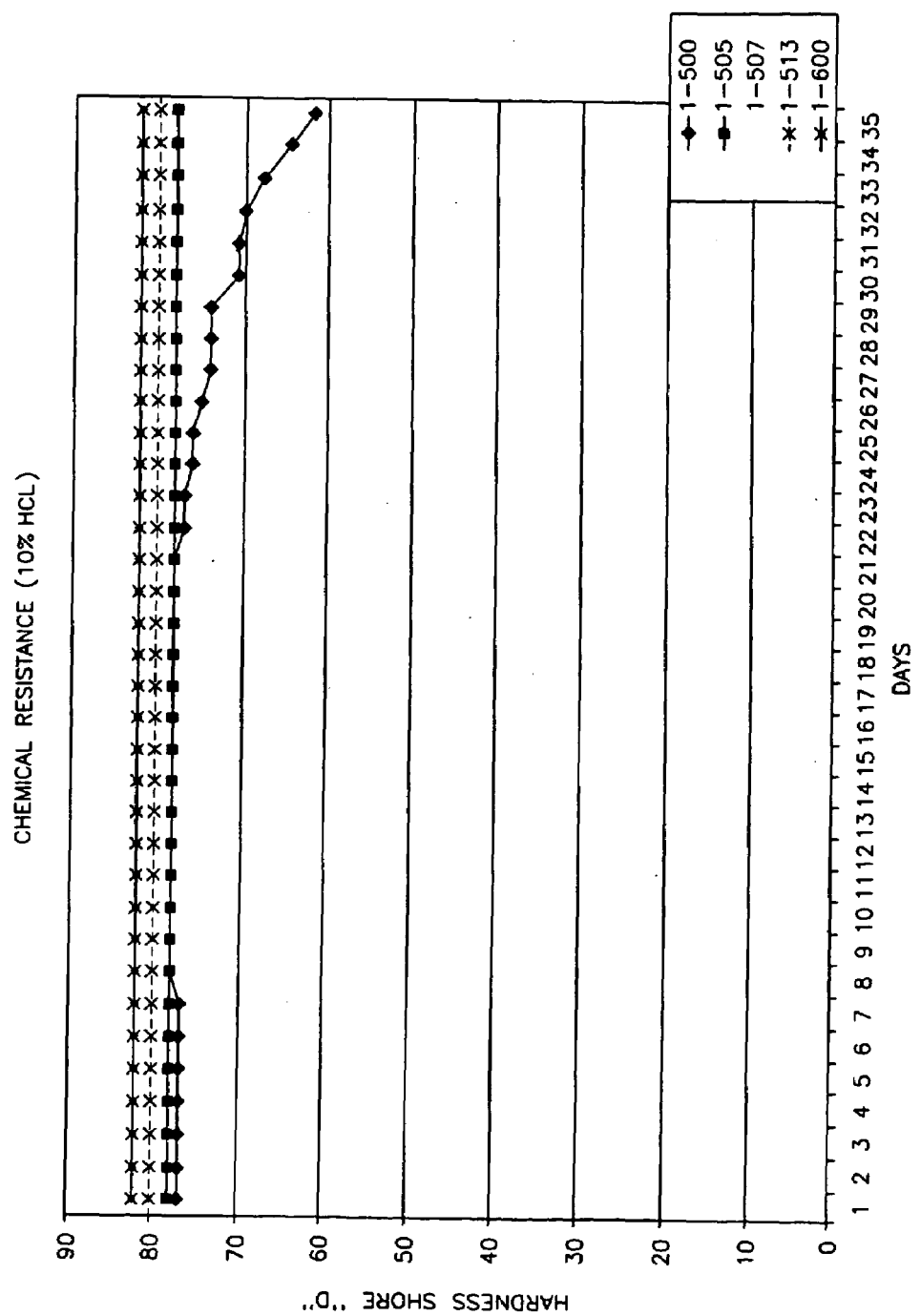
FIG. 9 shows the relative hardness of five resins produced from the compositions and methods according to the invention as a function of exposure time in 10% aqueous hydrochloric acid and as a function of the composition.
Figure 10:
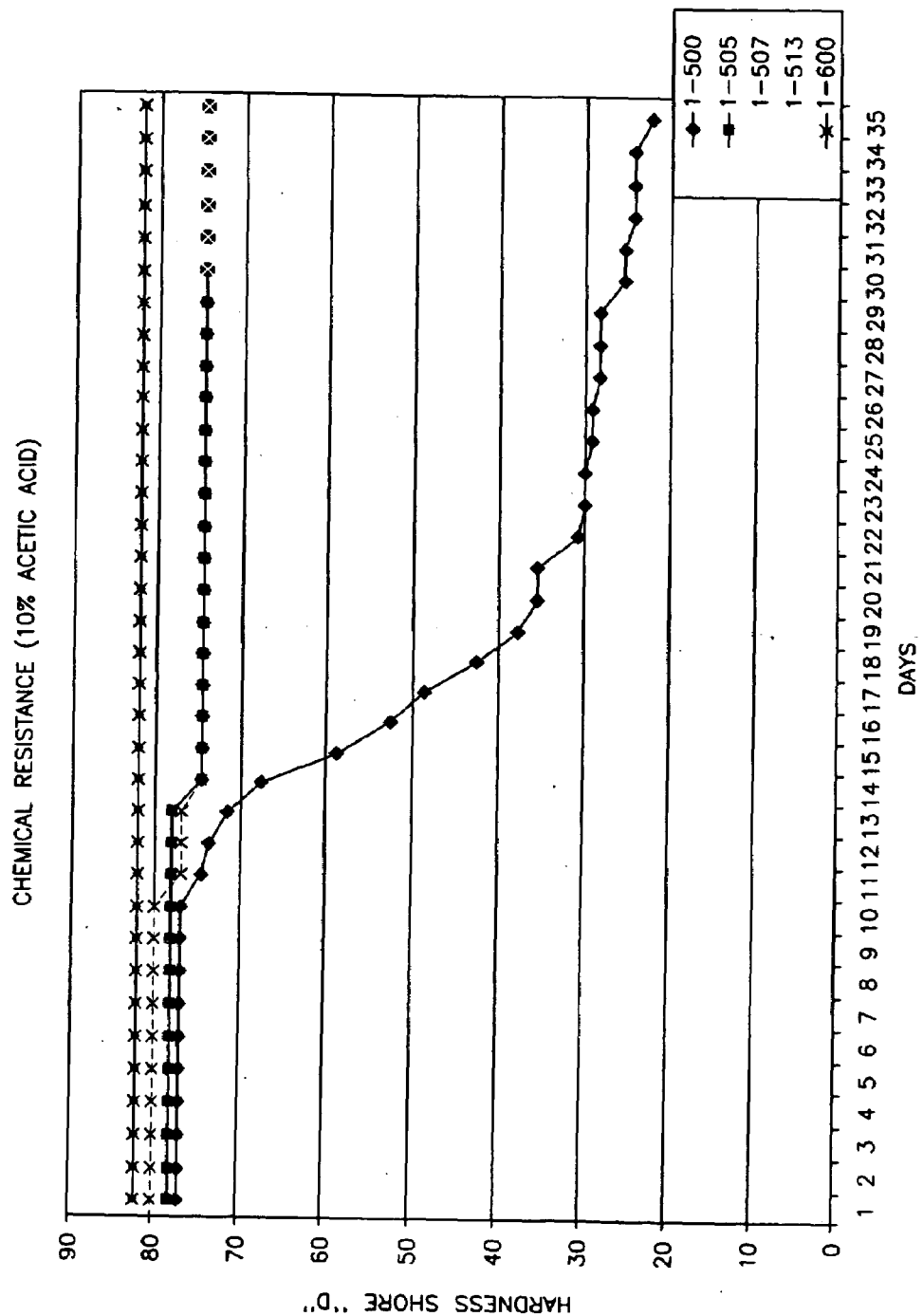
FIG. 10 shows the relative hardness of five resins produced from the compositions and methods according to the invention as a function of exposure time in 10% acetic acid and as a function of the composition.

FIGS. 3–5 illustrate the average gelling time for the resins resulting from mixing the polyisocyanate and polyisocyanate reactive compositions described in Tables 1–3. FIG. 3 shows the gelling time as a function of percent composition of NH 1220 for the compositions described in Table 1. FIGS. 4 and 5 show the respective relative gelling time as a function of percent composition of NH 1220 for the respective compositions detailed in Tables 2–3. FIGS. 3–5 each show that as the percentage of the polyaspartic ester is increased, the resulting resins gel faster.

A preferred resin according to the invention useful for spray application may be prepared as follows. In a first step approximately 35 percent by weight of the poly-aspartic ester shown in FIG. 1 where X is an n-hexyl group, R1 and R2 are each ethyl goups, R3 and R4 are each hydrogens and n=2 and approximately 65% by of the cycloaliphatic amine shown in FIG. 2 where Y1 and Y2 are each methyl groups, Y3 and Y4 are each hydrogens and Y5 and Y6 are each hydrogen atoms are separately heated to 100° F. to 160° F. Next, the poly-aspartic ester/cycloaliphatic amine mixtures are then preferably mixed into a mixing vessel preheated to 100° F. to 160° F. Trace amounts of defoamer (such as 0.1% by weight of BYK322, or BYK065 manufactured by BYK Chemie of Wallingford, Conn., or EFCA722) and/or an adhesion promoter (such as 0.05% A1120 or A187 manufactured by OSI Specialties of Friendly, W.Va.) and/or a UV stabilizer (such as Tinuvin 292 manufactured by Ciba Specialty Chemicals of McIntosh, Ala.) may also be added to the mixture. This mixture of the polyaspartic ester, cycloaliphatic amine, defoamer, UV stabilizer and silane is then preferably vacuum sealed. An applicator wishing to coat an object with a polymer then mixes sufficient volumes of a preferred polyisocyanate such as 1,6 hexamethylene biuret and the poly-aspartic ester/cycloaliphatic amine mixture such that approximately 1 isocyanate equivalent is reacted with approximately 1 isocyanate reactive equivalent and applies the combination mixture on the goods to be coated. This may be conveniently done with a plural component spray gun.

Another preferred resin according to the invention useful for spray application may be prepared as follows. In a first step, approximately 85% per cent by weight of 1,6-hexamethylene diisocyanate biuret and 15 percent by weight of 1,6 hexamethylene uretidione dimer are separately heated at 100° F. to 160° F. and then mixed in a preheated container at 100° F. to 160° F. When this polyisocyanate mixture cools it is then packaged and vacuum-sealed. In a second step, approximately 25 percent by weight of the poly-aspartic ester shown in FIG. 1 where X is an n-hexyl group, R1 and R2 are each ethyl goups, R3 and R4 are each hydrogens and n=2 and 75 percent by weight of the cycloaliphatic amine shown in FIG. 2 where Y1 and Y2 are each methyl groups, Y3 and Y4 are each hydrogens and Y5 and Y6 are each hydrogen atoms are separately heated to 100° F. to 160° F. mixed into a vessel preheated to 100° F. to 160° F. Trace amounts of defoamer (such as 0.1% by weight of BYK233, or BYK065 manufactured by BYK Chemie of Wallingford, Conn.) and/or a defoamer (such as 0.05% A1120 or A187 manufactured by OSI Specialties of Friendly, W.Va.) and/or an adhesion promoter (such as Tinuvin 292 manufactured by Ciba Specialty Chemicals of McIntosh, Ala.) may also be added to the mixture. This mixture of the polyaspartic ester, cycloaliphatic amine, defoamer, UV stabilizer and silane is then preferably vacuum-sealed. An applicator wishing to coat an object with a polymer then mixes sufficient volumes of the polyisocyant mixture and poly-aspartic ester/cycloaliphatic amine mixture such that approximately 1 equivalent of isocyanate is reacted with approximately 1 equivalent of isocyanate reactive groups. This combination mixture may then be applied on the goods to be coated with a plural component spray gun. The polyisocyanate component is preferably mixed with polyisocyanate reactive components such that approximately 1 equivalent of isocyanate is reacted with 1 equivalent of isocyanate reactive groups. Although a 1:1 isocyanate reaction stoichiometry is preferred, one skilled in art will recognize this ratio may be adjusted up or down to modify the speed of the reaction, the extent of the reaction or the viscosity of the resulting resin. In one embodiment a stoichiometry of approximately 1:2 is preferred. In another embodiment a stoichiometry of approximately 2:1 is preferred.

In order to further demonstrate the utility of the resins according to the invention, experiments were performed to determine the resistance of these resin: 1) to acid catalyzed degradation in the presence of a strong, mild and weak acid; 2) to aqueous degradation; the resistance and 3) to base catalyzed degradation. Four compositions were considered: 1-500, 1-505, 1-513, 1-600.

The 1-500 composition represents a resin formed by mixing a polyisocyanate component comprising 80% by weight XP-7100 and 20% by weight of the HD-100 and the polyaspartic ester shown in FIG. 1 where, X is an n-hexyl group, R1 and R2 are each ethyl goups, R3 and R4 are each hydrogens and n=2 such that approximately 1 equivalent of isocyanate is reacted with approximately 1 equivalent of isocyanate reactive groups.

The 1-505 composition represents a polymer formed by a polyisocyanate component comprising 80% by weight XP-7100 and 20% by weight of the HD-100 with a polyisocyanate reactive component comprising 95% by weight of the polyaspartic ester shown in FIG. 1 where X is an n-hexyl group, R1 and R2 are each ethyl goups, R3 and R4 are each hydrogens and n=2 and 5% by weight of the cycloaliphatic amine shown in FIG. 2 where Y1 and Y2 are each methyl groups, Y3 and Y4 are each hydrogens and Y5 and Y6 are each hydrogen atoms such that approximately 1 equivalent of isocyanate is reacted with approximately 1 equivalent of isocyanate reactive groups.

The 1-507 composition represents a polymer formed by a polyisocyanate component comprising 80% by weight XP-7100 and 20% by weight of the HD-100 with a polyisocyanate reactive component comprising 65% by weight of the poly-aspartic ester shown in FIG. 1 where X is an n-hexyl group, R1 and R2 are each ethyl goups, R3 and R4 are each hydrogens and n=2 and 35% by weight of the cycloaliphatic amine shown in FIG. 2 where Y1 and Y2 are each methyl groups, Y3 and Y4 are each hydrogens and Y5 and Y6 are each hydrogen atoms such that approximately 1 equivalent of isocyanate is reacted with approximately 1 equivalent of isocyanate reactive groups.

The 1-513 composition represents a polymer formed by a polyisocyanate component comprising 80% by weight XP-7100 and 20% by weight of the HD-100 with a polyisocyanate reactive component comprising 50% by weight of the poly-aspartic ester shown in FIG. 1 where X is an n-hexyl group, R1 and R2 are each ethyl goups, R3 and R4 are each hydrogens and n=2 and 50% by weight of the cycloaliphatic amine shown in FIG. 2 where Y1 and Y2 are each methyl groups, Y3 and Y4 are each hydrogens and Y5 and Y6 are each hydrogen atoms such that approximately 1 equivalent of isocyanate is reacted with approximately 1 equivalent of isocyanate reactive groups.

The 1-600 composition represents a polymer formed by a polyisocyanate component comprising 80% by weight XP-7100 and 20% by weight of the HD-100 with a polyisocyanate reactive component comprising 35% by weight of the poly-aspartic ester shown in FIG. 1 where X is an n-hexyl group, R1 and R2 are each ethyl goups, R3 and R4 are each hydrogens and n=2 and 65% by weight of the cycloaliphatic amine shown in FIG. 2 where Y1 and Y2 are each methyl groups, Y3 and Y4 are each hydrogens and Y5 and Y6 are each hydrogen atoms such that approximately 1 equivalent of isocyanate is reacted with approximately 1 equivalent of isocyanate reactive groups.

Figure 11:
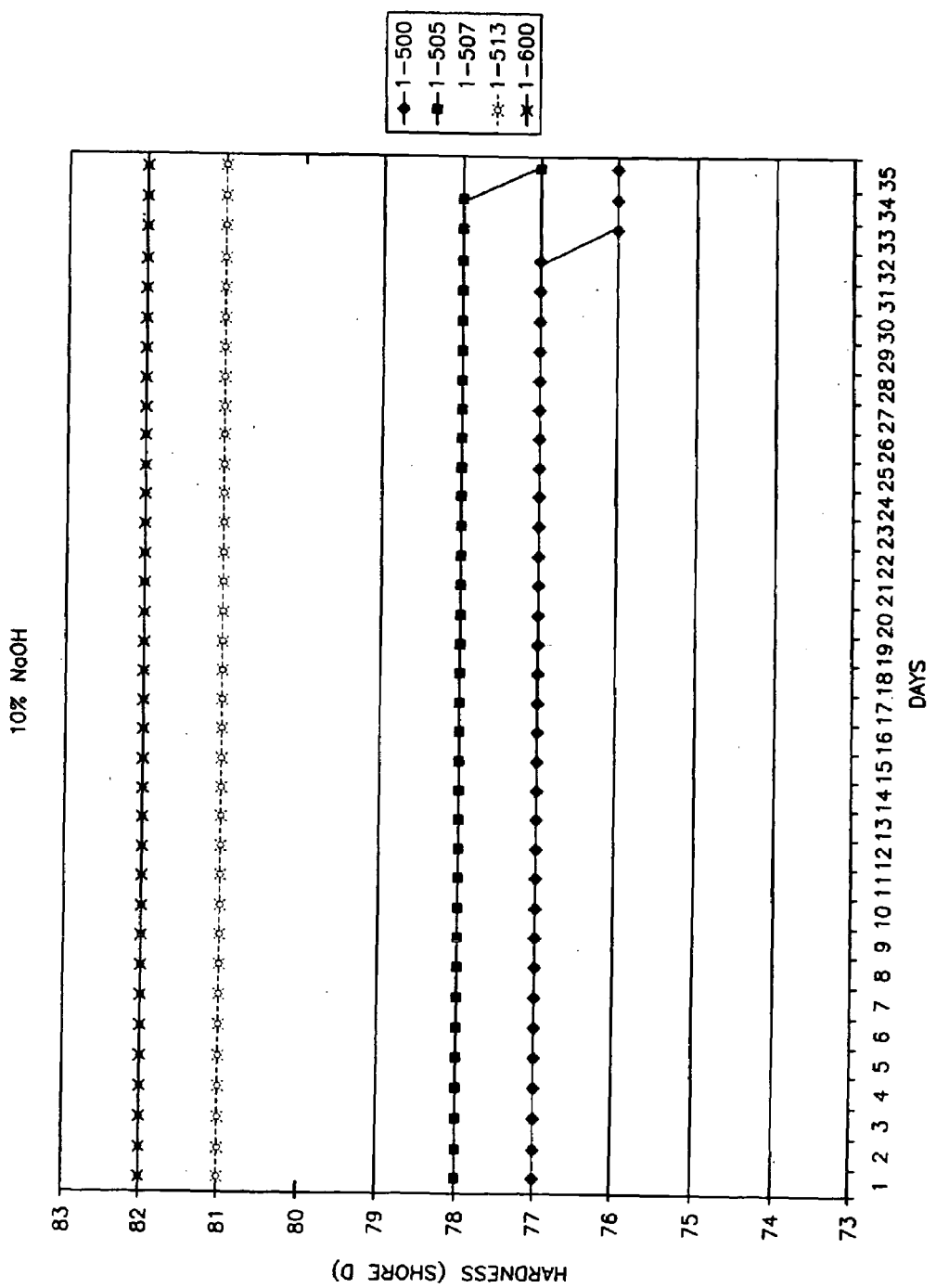
FIG. 11 shows the relative hardness of five resins produced from the compositions and methods according to the invention as a function of exposure time in 10% NaOH and as a function of the composition.

FIGS. 6–11 show the relative hardness of each resin, as measured by the Shore D test, as a function of time and when exposed to salt water (FIG. 6), water (FIG. 7), 10% sulfuric acid (FIG. 8), 10% hydrochloric acid (FIG. 9), 10% acetic acid (FIG. 10) and 10% NaOH (FIG. 11). In each test, the relative hardness of resulting polymers increased as a function of the percentage by weight of the cycloaliphatic amine along with the relative hardness as a function of time.

Turning now to Table 4, it can also be seen that the glass transition temperature, namely, the temperature that the polymer transitions from a crystalline to a glassy structure, increases as a function of the percentage by weight of the cycloaliphatic amine. Thus, in applications where the polymer may be exposed to high temperatures it is preferable to use a formulation with high percentage of a cycloaliphatic amine.

TABLE 4

| Resin Formulation | Glass Transition Temperature |
| --- | --- |
| 1–500 | 41° C. |
| 1–505 | 44° C. |
| 1–513 | 49° C. |
| 1–600 | 78° C. |

Figure 12:
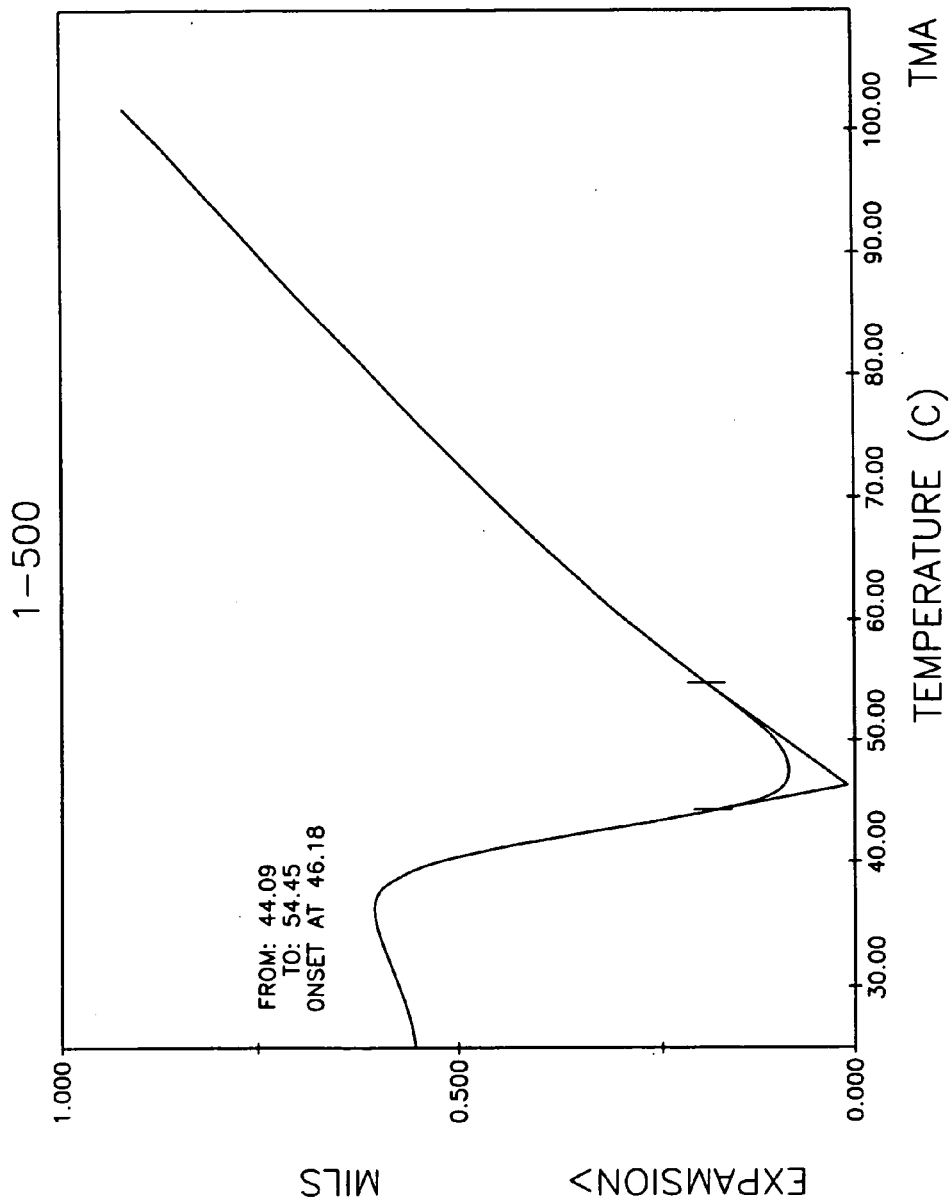
FIG. 12 shows the thermal expansion of a resin as a function of temperature for a preferred polymer formulation.
Figure 13:
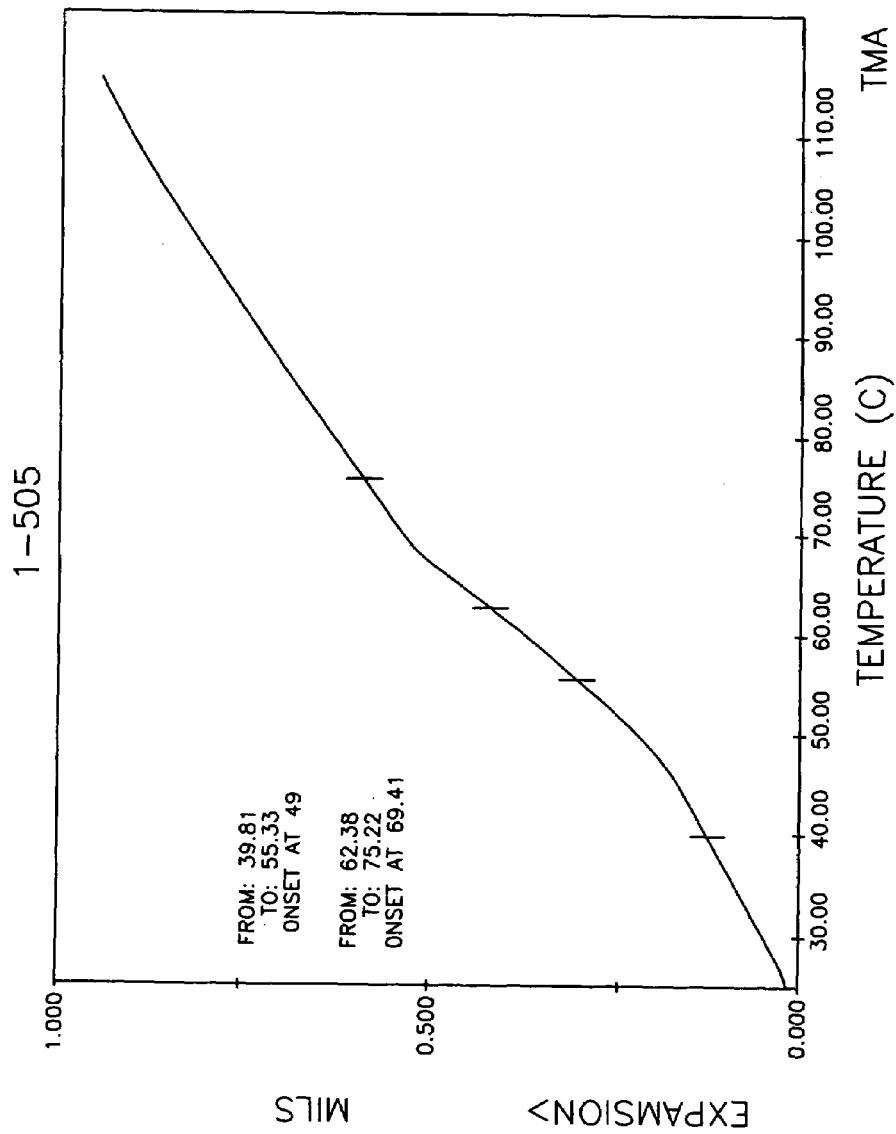
FIG. 13 shows the thermal expansion of a resin as a function of temperature for a preferred polymer formulation.
Figure 14:
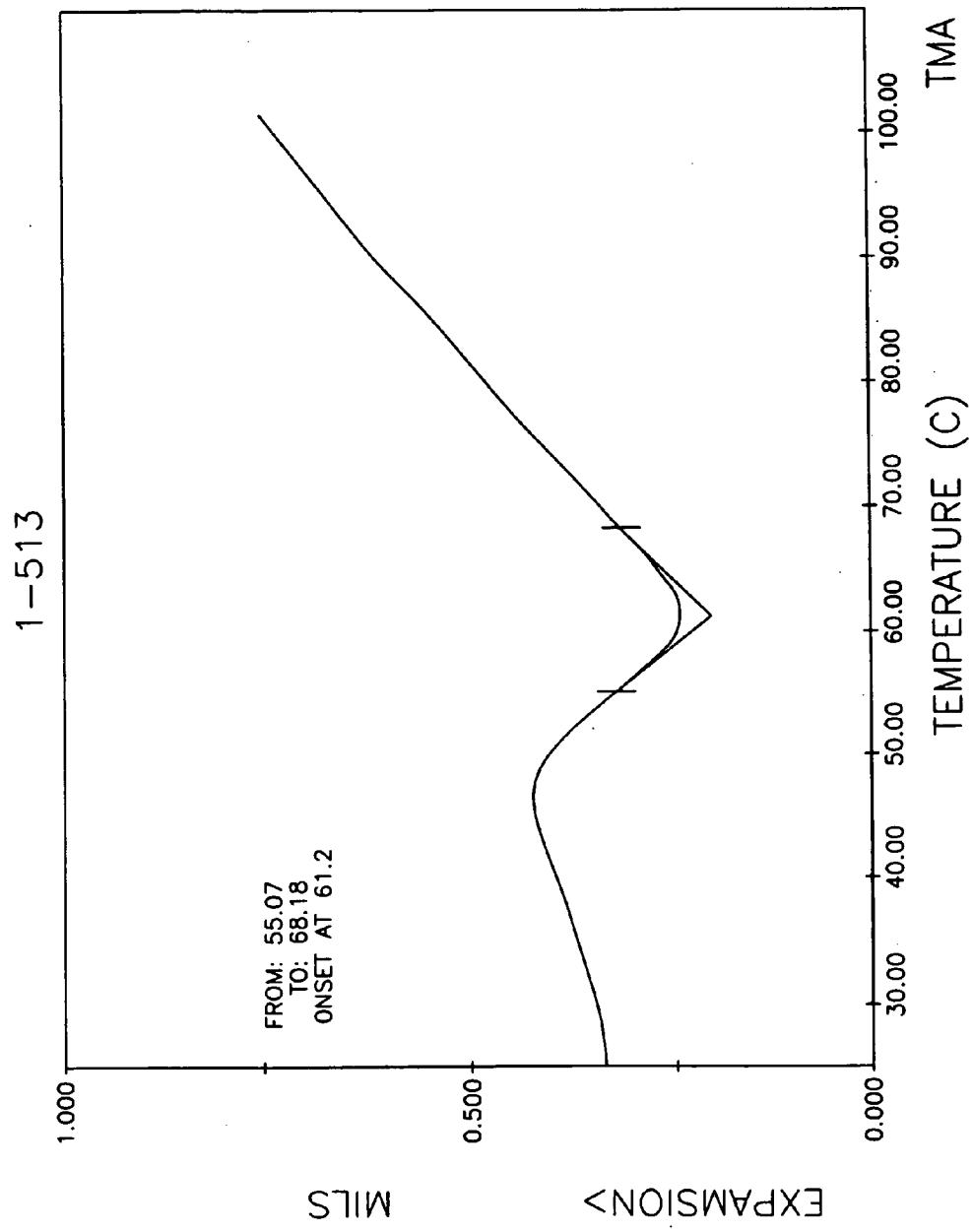
FIG. 14 shows the thermal expansion of a polymer as a function of temperature for a preferred polymer formulation.
Figure 15:
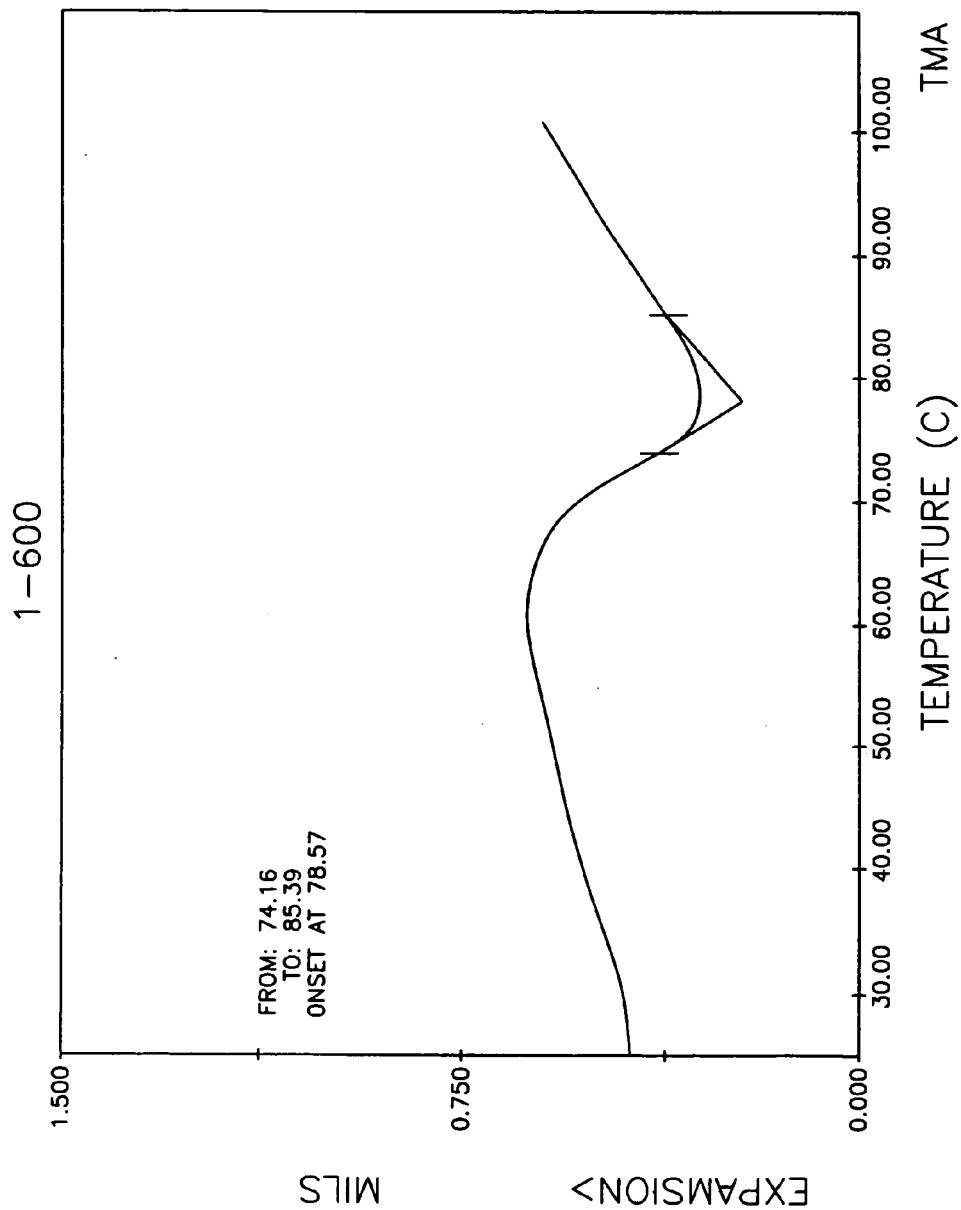
FIG. 15 shows the thermal expansion of a polymer as a function of temperature for a preferred polymer formulation.

Turning now to FIGS. 12–15. FIG. 12 shows the thermal expansion of the 1-500 system as a function of temperature. FIG. 13 shows the thermal expansion of the 1-505 system as a function of temperature. FIG. 14 shows the thermal expansion of the 1-513 system as a function of temperature. FIG. 15 shows the thermal expansion of the 1-600 system as a function of temperature. The inflection point of each thermal expansion curve reflects the glass transition temperature. Thus, as can be seen from FIGS. 12–15, the thermal expansion properties of a polymer can be controlled by the adjusting relative amount of the polyaspartic ester to the amount of the cycloaliphatic amine. More particularly, FIGS. 12–15 show that a higher glass transition temperature is obtained as the percentage of cycloaliphatic amine is added to the polyisocyanate reactive component.

Since the polyisocyanate components and the polyisocyanate reactive components according to the invention have a low viscosity, react quickly at ambient temperature, they may be readily used to coat goods with air spraying applicators airless spraying applicators, electrostatic spraying applicators, rolling applicators. Binary spray applicators are especially preferred to coat goods. Because the resins according to the invention do not require volatile organic solvents, they may be readily made and applied to goods without implicating local, state and federal environmental regulations. There are no restrictions to the type of substances that may be coated. Suitable surfaces, plastics, rubbers, woods, glasses, concrete, woods and paper products. In addition to coating goods to form a protective surface, the resins according to the invention may be used to as adhesives by applying the resins to one surface and then adhering a second surface to the first surface with pressure.

Because they are hard and tough, the compositions of the present invention may also be used in a variety of resin mold products. For example, the compositions may be used as a casting material, or as an encapsulant. In one embodiment of the present invention, the resin is used to coat electronic circuitry to protect it from impact and dirt.

The foregoing discussion and examples are only illustrative and are not intended to limit the invention. It is understood that modifying the examples above does not depart from the spirit of the invention. It is further understood that the examples can be applied independently or in combination with each other.

The invention claimed is:

1. A composition comprising:
   i. a polyisocyanate component;
   ii. a polyisocyanate reactive component comprising a polyaspartic ester having the general formula:

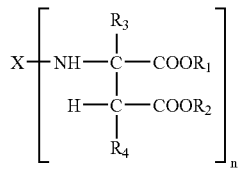

TABLE 1

Comparison of Hardness (Shore D)

| | | \multicolumn{10}{c}{HD100/XP7100} |
|---|---|---|---|---|---|---|---|---|---|---|---|
| | | 100/0 | | 75/25 | | 50/50 | | 20/80 | | 0/100 | |
| | | 1 day | 3 day | 1 day | 3 day | 1 day | 3 day | 1 day | 3 day | 1 day | 3 day |
| Clearlink1000/ | 100/0 | 81 | 83 | 81 | 83 | 83 | 84 | 84 | 84 | 82 | 84 |
| NH1220 | 80/20 | 82 | 82 | 82 | 84 | 81 | 82 | 84 | 84 | 84 | 85 |
| | 65/35 | 81 | 84 | 81 | 83 | 83 | 84 | 82 | 83 | 84 | 84 |
| | 55/45 | 81 | 80 | 81 | 80 | 81 | 81 | 82 | 82 | 82 | 81 |
| | 25/75 | 78 | 80 | 80 | 80 | 81 | 81 | 81 | 82 | 80 | 82 |
| | 0/100 | 75 | 75 | 78 | 75 | 79 | 79 | 79 | 80 | 80 | 81 |

TABLE 2

Comparison of Hardness (Shore D)

| | | \multicolumn{10}{c}{HD100/HDB-LV} |
|---|---|---|---|---|---|---|---|---|---|---|---|
| | | 100/0 | | 75/25 | | 50/50 | | 25/75 | | 0/100 | |
| | | 1 day | 3 day | 1 day | 3 day | 1 day | 3 day | 1 day | 3 day | 1 day | 3 day |
| Clearlink1000/ | 100/0 | | 83 | | 83 | | 85 | | 84 | Not determined | |
| NH1220 | 80/20 | | 82 | | 83 | | 83 | | 82 | | 84 |
| | 65/35 | | 84 | | 82 | | 82 | | 83 | | 84 |
| | 55/45 | 81 | 80 | 80 | 80 | 82 | 81 | 81 | 80 | 84 | 82 |
| | 25/75 | | 80 | | 81 | | 82 | | 81 | | 81 |
| | 0/100 | | 75 | | 80 | | 80 | | 80 | | 82 |

TABLE 3

Comparison of Hardness (Shore D)

| | | \multicolumn{10}{c}{HD100/N3300} |
|---|---|---|---|---|---|---|---|---|---|---|---|
| | | 100/0 | | 75/25 | | 50/50 | | 25/75 | | 0/100 | |
| | | 1 day | 3 day | 1 day | 3 day | 1 day | 3 day | 1 day | 3 day | 1 day | 3 day |
| Clearlink1000/ | 100/0 | | 83 | | 82 | | 83 | | 84 | | 85 |
| NH1220 | 80/20 | | 82 | | 82 | | 84 | | 83 | | 85 |
| | 65/35 | | 84 | | 82 | | 84 | | 84 | | 80 |
| | 55/45 | 81 | 80 | 81 | 81 | 81 | 82 | 81 | 80 | 83 | 82 |
| | 25/75 | | 80 | | 81 | | 81 | | 83 | | 82 |
| | 0/100 | | 75 | | 80 | | 80 | | 81 | | 82 | wherein R1, R2, R3, R4, each is an organic functional group, which is inert towards an isocyanate group, or hydrogen, X is an alkyl or cycloaliphatic group, and n is an integer of at least 2;

and a cycloaliphatic amine having the general formula:

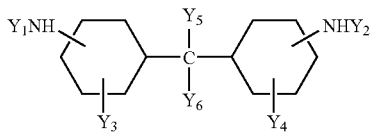

wherein Y1, and Y2 each is an alkyl group with one to ten carbons, and Y3, Y4, Y5, and Y6 each is a hydrogen atom or an alkyl group having one to five carbons; and iii. wherein said composition is adapted for a coating.

2. The composition of claim 1 wherein R1 and R2 are each independently selected from the group consisting of methyl functional groups, ethyl functional groups, propyl functional groups, and butyl functional groups.

3. The composition of claim 1 wherein R3 and R4 are each hydrogen.

4. The composition of claim 1 wherein X is selected from the group of compounds formed by removing amino groups from: 1,4-diaminobutane, 1,6-diaminohexane, 2,2,4-trimethyl-1,6-diaminohexane, 2,4,4-trimethyl-1,6-diaminohexane, 1-amino-3,3,5-trimethyl-5-aminomethylcyclohexane, 4,4'-diamino-dicyclohexylmethane, 3,3'-dimethyl-4,4'-diamino-dicyclohexylmethane, 2-methyl-1,5-diaminopentane, 1,11-diaminoundecane, 1,12-diaminododecane, 1,4-diaminocyclohexane or 1,2-diaminocyclohexane.

5. The composition of claim 1 wherein Y1 and Y2 are each independently selected from the group consisting of: methyl functional groups, ethyl functional groups, propyl functional groups, butyl functional groups, pentyl functional groups, hexyl functional groups, heptyl functional groups, octyl functional groups, and the isomeric forms of these compounds.

6. The composition of claim 1 wherein Y1 and Y2 are each independently selected from the group consisting of methyl functional groups, ethyl functional groups, propyl functional groups, butyl functional groups, pentyl functional groups, and the isomeric forms of these groups, and Y3, Y4, Y5 and Y6 are each independently selected from the group consisting of; hydrogen, methyl functional groups, ethyl functional groups, propyl function groups, butyl function groups, pentyl functional groups and the isomeric forms of these groups.

7. The composition of claim 1 wherein Y1 and Y2 are each independently selected from the group consisting of methyl functional groups.

8. The composition of claim 1 wherein Y3 and Y4 are each hydrogen.

9. The composition of claim 1 wherein said polyisocyanate component is a monomeric or polymeric polyisocyanate selected from the group consisting of: aromatic diisocyanates such as 2,4-toluene diisocyanate, 2,6-toluene diisocyanate, 4,4'-diphenylmethane diisocyanate, 2,4'-diphenylmehtane diisocyanate, 2,2'-diphenylmethane diisocyanate, 1,2-phenylene diisocyanate, 1,3-phenylene diisocyanate, 1,4-phenylene diisocyanate, 1,4-naphthalene diisocyanate, 1,5-naphthalene diisocyanate, chlorophenylene-2,4-diisocyanate, 4,4'-diphenyl ether diisocyanate, 3,3'-dimethyldiphenylmethane-4,4'-diisocyanate, 3,3'-dimethoxydiphenyl-4,4'-diisocyanate; aliphatic diisocyanates such as 1,6-hexamethylene diisocyanate, 1,4-tetramethylene diisocyanate, 2,2,4-trimethyl-1,6-hexamethylene diisocyanate, 2,4,4-trimethyl-1,6-hexamethylene diisocyanate, decamethylene diisocyanate, lysine diisocyanate; arylaliphatic diisocyanates such as o-xylene diisocyanate, m-xylene diisocyanate, p-xylene diisocyanate; and alkyl-cyclic diisocyanates such as 1,4-diisocyanate, isophorone diisocyanate, hydrogenated toluene diisocyanate, hydrated xylene diisocyanate.

10. The composition of claim 1 wherein said polyisocyanate component containing at least one kind of bond selected from group consisting of uretdione bonds, isocyanurate bonds, allophanate bonds, biuret bonds, uretonimine bonds, carbodiimide bonds, urethane bond, and urea bonds.

11. The composition of claim 1, wherein said composition comprises approximately 1 equivalent of said polyisocyanate component, and approximately 1 equivalent total of said polyaspartic ester and said cycloaliphatic amine.

12. The composition of claim 11 wherein said cycloaliphatic amine comprises from about 5% to 95% by weight of said polyisocyanate reactive component.

13. A composition comprising:
i. a polyisocyanate component;
ii. a polyisocyanate reactive component comprising a polyaspartic ester having the general formula:

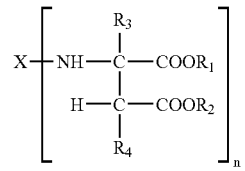

wherein R1 and R2 are each independently selected from the group consisting of methyl functional groups, ethyl functional groups, propyl functional groups, and butyl functional groups, R3, and R4 are each hydrogen, X is selected from the group consisting of: hexyl functional groups, 2,2,4-trimethyl-hexyl functional groups, 2,4,4-trimethyl hexyl functional groups, 3,3,5-trimethyl cyclohexyl functional groups, and dicyclohexyl functional groups, and n is an integer of at least 2;

and a cycloaliphatic amine having the general formula:

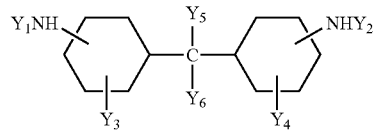

wherein Y1, and Y2 each is an alkyl group with from one to ten carbons, and Y3, Y4, Y5, and Y6 each is an alkyl group with from one to live carbons or a hydrogen atom; and iii. wherein said composition is adapted for a coating.

14. The composition of claim 13 wherein said cycloaliphatic amine comprises from about 5% to 95% by weight of said polyisocyanate reactive component.

15. A composition comprising:
i. a polyisocyanate component;
ii. a polyisocyanate reactive component comprising a polyaspartic ester having the general formula:

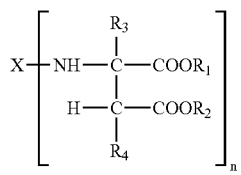

wherein R1, R2, R3, R4, each is an organic functional group, which is inert towards an isocyanate group, or hydrogen, X is an alkyl or cycloaliphatic group, and n is an integer of at least 2;

and a cycloaliphatic amine having the general formula:

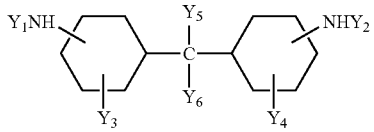

wherein Y1, and Y2 each are independently hydrogen or methyl groups, and Y3, Y4, Y5, and Y6 are each independently selected from the group consisting of: hydrogen, methyl functional groups, ethyl functional groups, propyl functional groups, butyl functional groups, pentyl functional groups, and the isomeric forms of these groups; and iii. wherein said composition is adapted for a coating.

16. The composition of claim 15 wherein said cycloaliphatic amine comprises from about 5% to 95% by weight of said polyisocyanate reactive component.

17. A composition comprising:
i. polyisocyanate component comprising monomeric or polyisocyanate components selected from the group consisting of: aromatic diisocyanates such as 2,4-toluene diisocyanate, 2,6-toluene diisocyanate, 4,4'-diphenylmethane diisocyanate, 2,4'-diphenylmethane diisocyanate, 2,2'-diphenylmethane diisocyanate, 1,2-phenylene diisocyanate, 1,3 diisocyanate, 1,4-phenylene diisocyanate, 1,4-naphthalene diisocyanate, 1,5 naphthalene diisocyanate, chlorophenylene-2,4-diisocyanate, 4,4'-diphenyl ether diisocyanate, 3,3'-dimethyldiphenylmethane-4,4'-diisocyanate, 3,3'-dimethoxydiphenyl-4,4'-diisocyanate; aliphatic diisocyanates such as 1,6-hexamethylene diisocyanate, 1,4-tetramethylene diisocyanate, 2,2,4-trimethyl-1,6-hexamethylene diisocyanate, 2,4,4-trimethyl-1,6-hexamethylene diisocyanate, decamethylene diisocyanate, lysine diisocyanate; arylaliphatic diisocyanates such as o-xylene diisocyanate, m-xylene diisocyanate, p-xylene diisocyanate; and allkyl-cyclic diisocyanates such as 1,4-cyclohexyl diisocyanate, isophorone diisocyanate, hydrogenated toluene diisocyanate, hydrogenated xylene diisocyanate;

ii. a polyisocyanate reactive component comprising a polyaspartic ester having the general formula:

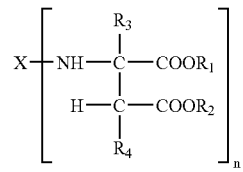

wherein R1, R2, R3, R4, each is an organic functional group, which is inert towards an isocyanate group, or hydrogen, X is an alkyl or cycloaliphatic group, and n is an integer of at least 2;

and a cycloaliphatic amine having the general formula:

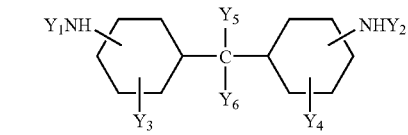

wherein Y1, and Y2 each is an alkyl group with from one to ten carbons, and Y3, Y4, Y5, and Y6 each is an alkyl group with from one to five carbons or a hydrogen atom; and iii. wherein said composition is adapted for a coating.

18. The composition of claim 17 wherein said cycloaliphatic amine comprises from about 5% to 95% by weight of said polyisocyanate reactive component.

19. A composition comprising:
i. polyisocyanate component comprising a monomeric or polymeric polyisocyanate selected from the group consisting of: aromatic diisocyanates such as 2,4-toluene diisocyanate, 2,6-toluene diisocyanate, 4,4'-diphenylmethane diisocyanate, 2,4'-diphenylmethane diisocyanate, 2,2'-diphenylmethane diisocyanate, 1,2-phenylene diisocyanate, 1,3-phenylene diisocyanate, 1,4-phenylene diisocyanate, 1,4-naphthalene diisocyanate, 1,5-naphthalene diisocyanate, chlorophenylene-2,4-diisocyanate, 4,4'-diphenyl ether diisocyanate, 3,3'-dimethyldiphenylmethane-4,4'-diisocyanate, 3,3'-dimethoxydiphenyl-4,4'-diisocyanate; aliphatic diisocyanates such as 1,6-hexamethylene diisocyanate, 1,4-tetramethylene diisocyanate, 2,2,4-trimethyl-1,6-hexamethylene diisocyanate, 2,4,4-trimethyl-1,6-hexamethylene diisocyanate, decamethylene diisocyanate, lysine diisocyanate; arylaliphatic diisocyanates such as o-xylene diisocyanate, m-xylene diisocyanate, p-xylene diisocyanate; and allkyl-cyclic diisocyanates such as 1,4-cyclohexyl diisocyanate, isophorone diisocyanate, hydrogenated toluene diisocyanate, hydrogenated xylene diisocyanate;

ii. a polyisocyanate reactive component comprising a polyaspartic ester having the general formula:

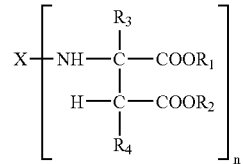

wherein R1 and R2 are each independently selected from the group consisting of: methyl functional groups, ethyl functional groups, propyl functional groups and butyl functional groups, R3, and R4 are each hydrogen, X is selected from the group consisting of: hexyl functional groups, 2,2,4-trimethyl-hexyl functional groups, 2,4,4-trimethyl hexyl functional groups, 3,3,5-trimethyl cyclohexyl functional groups, and dicyclohexyl functional groups, and n is an integer of at least 2;

and a cycloaliphatic amine having the general formula:

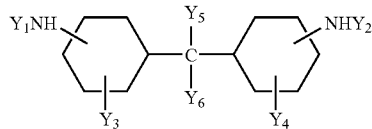

wherein Y1, and Y2 each are methyl groups, and Y3, Y4, Y5, and Y6 are each independently selected from the group consisting of: hydrogen, methyl functional groups, ethyl functional groups, propyl functional groups, butyl functional groups, pentyl functional groups, and the isomeric forms of these groups; and iii. wherein said composition is adapted for a coating.

20. The composition of claim 19 wherein said cycloaliphatic amine comprises from about 5% to 95% by weight of said polyisocyanate reactive component.

21. A composition comprising:
i. a polyisocyanate component comprising a N,N'N''-tris-hexamethylene isocyanurate, N,N'-bis-uretidione and allophanate;
ii. a polyisocyanate reactive component comprising a polyaspartic ester having the general formula:

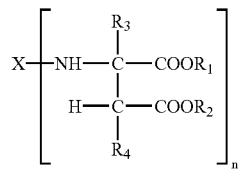

wherein X is an n-hexyl group, R1 and R2 are each ethyl groups, R3 and R4 are each hydrogens, and n=2;

and a cycloaliphatic amine having the general formula:

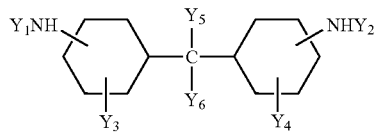

wherein Y1 and Y2 are each methyl groups, Y3 and Y4 are each hydrogens and Y5 and Y6 are each hydrogen atoms; and iii. wherein said composition is adapted for a coating.

22. The composition of claim 21, wherein said cycloaliphatic amine comprises from approximately 5% to 95% of the weight of said polyisocyanate reactive component.

23. The composition of claim 21, wherein said cycloaliphatic amine comprises from approximately 50% to 95% of the weight of said polyisocyanate reactive component.

* * * * *